Nov. 13, 1956 R. J. REEK 2,770,734

TRANSISTOR RELAY DEVICE

Filed Jan. 22, 1953

INVENTOR
ROBERT J. REEK

BY Emery Robinson
ATTORNEY 2,770,734

TRANSISTOR RELAY DEVICE

Robert J. Reek, Bellwood, Ill., assignor to Teletype Corporation, Chicago, Ill., a corporation of Delaware Application January 22, 1953, Serial No. 332,654
13 Claims. (Cl. 250—36)

Figure 1:
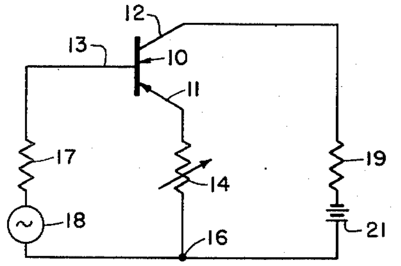

This invention relates to transistor relay devices and more particularly to a transistor oscillator adapted to be triggered on and off in response to a variation in circuit parameters due to an input signal.

In the design of relays for use in telegraph transmission systems, it is of paramount importance that the relays respond instantaneously to changing signal conditions without attenuation or mutilation of the signals. Often it is a prime requisite in the use of these relays to obtain electrical isolation between two sections of a communication system connected by relays so that signals having different reference potential levels may be transmitted from one circuit to another. Heretofore magnetic coil relays, electronic tubes and magnetic diodes have been used to obtain the afore-enumerated results, however, these devices are subjected to several limitations, such as excessive power consumption, time delay, short life, pitting contacts, considerable space requirements, feed-back, etc.

In the patent to J. Bardeen and W. H. Brattain, No. 2,524,035, dated October 31, 1950, there is disclosed a device which has been termed a transistor and which consists of a block of semiconductive material having two small area leads connected thereto making high resistance or rectifying contact and a third lead connected thereto making a low resistance contact. These leads have been denoted as the emitter, collector and base respectively.

In an article entitled "Transistors in switching circuits," by A. E. Anderson, published in the Proceedings of the I. R. E., vol. 40, No. 11, November 1952 issue, on page 1547, there is disclosed an oscillator comprising a transistor having an inductor in its base circuit. As indicated in this article, the transistor circuit may be operated to produce continuous oscillations by a proper selection of inductance and resistance components for use in the base circuit. It is possible to select other values of resistance to incorporate in this circuit to cause this circuit to cease oscillating and cut off. It has been found that if the value of a special inductance located in the base circuit of a transistor can be varied in response to an incoming current signal then the value of the effective resistance in the base circuit can be altered to cause the oscillator to commence operation.

It is a prime object of this invention to provide a triggered relay utilizing a transistor as its control element.

Another object of the invention resides in an improved relay which is small, fast acting, durable, and operable with small power consumption.

A further object of the invention is to provide a transistor relay which can be controlled by changing the value of inductance of the base circuit in accordance with signals.

A more finite object of the invention is to provide a transistor which can be transformed from a normal quiescent operating condition to an astable oscillating condition in response to an incoming signal.

A further and more specific object of the invention resides in the provision of a saturable core reactor in the base circuit of a transistor.

A still further object of the invention is to inductively couple the saturable core reactor with an incoming signal line.

It is another object of the invention to make the transistor relay responsive to tone signals.

With these and other objects in view, the present invention contemplates the use of a transistor having a saturable core reactor connected in its base circuit. Inductively coupled with the saturable core reactor is a coil contained in a telegraph signal transmission circuit. Circuit parameters for elements connected to the transistor are so selected and adjusted that the transistor is maintained substantially cut off when there is no signal in the transmission circuit. It is thus apparent that the transistor in this non-operating or cut off condition applies the voltage of the collector to an associated apparatus.

In the situation wherein there exists a signal in the transmission circuit, then the coil produces a magnetic field whose flux saturates the core of the saturable core reactor to effectively change the value of inductance and effective resistance of the saturable core reactor. The total impedance in the base circuit thereupon changes to cause said transistor to assume an astable operating condition to produce a steady train of output pulses at the collector of the transistor. Connected to the collector is a resistance-capacitance network which acts as a filter to attenuate the steady output of the negative voltage pulses and the output of the filter is applied to the apparatus.

Figure 2:
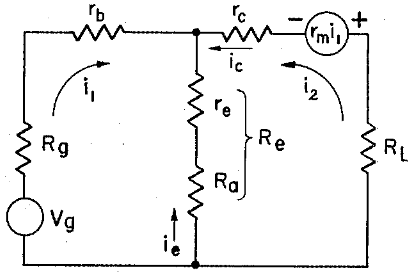
Figure 3:
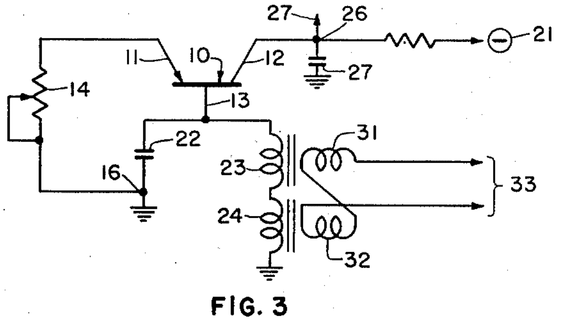
Figure 4:
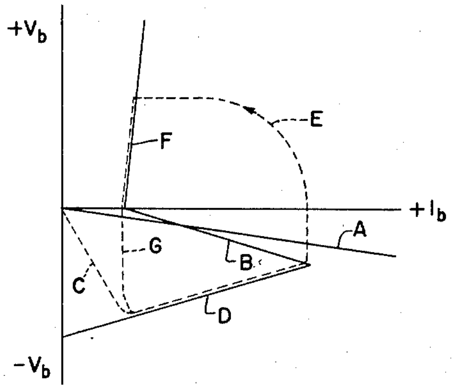
Figure 5:
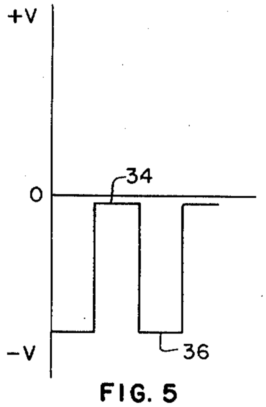
Figure 6:
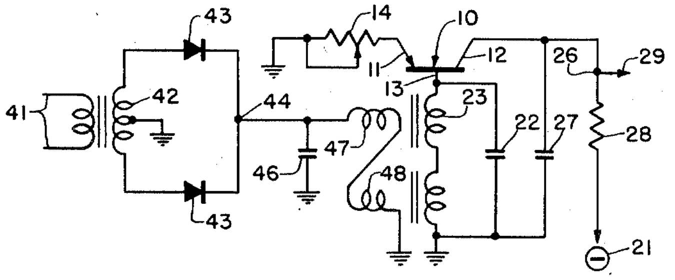

Other objects and advantages of the present invention will be apparent from the following detailed description when considered in conjunction with the accompanying drawings wherein:

Fig. 1 is a circuit diagram of a base input grounded base type of transistor amplifier, Fig. 2 is an equivalent for the circuit shown in Fig. 1, Fig. 3 is a circuit diagram of a transistor relay adapted to be operated by direct current signals in accordance with one embodiment of the invention, Fig. 4 is a curve showing the base characteristic of the transistor circuit shown in Fig. 1 together with a load line for one value of base impedance, Fig. 5 is an illustration of the collector waveform or output voltage for the transistor under two different operating conditions, and Fig. 6 is a circuit diagram of a transistor relay adapted to be operated by tone signals in accordance with another embodiment of the invention.

Referring to Fig. 1 there is disclosed a transistor generally designated by the reference numeral 10 which comprises a body of n-type semiconducting material. The body of semiconducting material may be composed of silicon, germanium, or selenium containing a minute but significant number of atomic impurities. In addition to the body, the transistor consists of an emitter 11 and a collector 12 making small area high resistance or rectifying contact with the body together with a base 13 connected to the body to provide a large area low resistance contact therebetween.

Emitter 11 is connected through an adjustable resistance 14 to a juncture point 16. Connected in series between the base 13 and the juncture point 16 is an internal resistance 17 of a source of alternating power 18. Interposed between the collector 12 and the juncture point 16 is a resistance 19 and a negative battery source 21 for the collector. Upon proper selection of circuit parameters, the circuit shown in Fig. 1 will operate as an amplifier; that is, the output of the power source 18 will be amplified by the transistor 10 and applied to the load resistance 19. It is believed that the theory of operation of this particular circuit has been amply described in the afore-identified patent to J. Bardeen et al. and need not be further explained herewith.

In Fig. 2 there is drawn an equivalent circuit for the base input grounded-emitter amplifier shown in Fig. 1. Using the symbols shown in Fig. 2 and the directions of current assumed therein, it may be noted that $i_2=i_c$ (the collector circuit), and further that $i_1=-i_e-i_c$. Then the mesh equations around each loop of the equivalent circuits may be written as:

$$(1)\qquad V_g=(R_g+r_b+R_e)i_1+R_ei_2$$

$$(2)\qquad O=(R_e-r_m)i_1+(R_1+r_c+R_e-r_m)i_2$$

where $R_g$=resistance of the A. C. generator $r_b$=internal resistance of the base $R_e$=the sum of the internal resistance of the emitter plus the adjustable resistance $R_a$ $r_m$=active mutual resistance of the transistor $r_c$=internal resistance of the collector $R_1$=load resistance The circuit will operate as a stable amplifier if the circuit determinant from the above mesh equations is greater than zero. Thus, $$(3)\qquad (R_g+r_b+R_e)(R_1+r_c+R_e-r_m)+R_e(r_m-R_e)>0$$

Rewriting and simplifying this expression, it then becomes, $$(4)\qquad \frac{r_m}{r_c+R_1}<1+\frac{R_e}{r_b+R_g}+\frac{R_e}{r_c+R_1}$$

In conclusion thereof it may be noted that by proper selections of values for $R_e$, $R_g$ and $R_1$ so that, the expression is satisfied, then the circuit shown in Fig. 1 will operate as an amplifier. If the values of $R_e$, $R_g$ and $R_1$ are such that the expression is not satisfied then the circuit will be astable and operate as an oscillator.

Attention is now directed to Fig. 3 wherein the circuit shown in Fig. 1 is modified in accordance with the principles of the invention, but elements of like character in the respective figures are identified by identical reference characters. The transistor 10 together with the emitter 11, the collector 12 and the base 13 again appear. Emitter 11 is again connected through the adjustable resistance 14 to the junction point 16. The junction point 16 is connected in one direction to ground and in the other direction through a capacitance 22 to the base. The base 13 is also connected through a pair of saturable core reactors having windings 23 and 24 connected in aiding series to ground.

These saturable core reactors exhibit the property of being capable of changing their inductance value in response to an application of magnetic flux to the cores. An example of a saturable core reactor which has been successively employed in the present invention consists of a continuous tape wound toroidal core wherein the core is a grain oriented 50 percent nickel-iron alloy having a rectangular hysteresis loop. Other saturable core reactors having cores of high permeability may be used with equal facility. If these reactors are subjected to flux from a D. C. field, the cores become saturated and the inductance of the coil windings 23 and 24 is effectively reduced.

It may be observed that the inductance (reactor windings 23 and 24) and the capacitance 22 are connected in parallel, hence providing a convenient resonant circuit which is adapted to oscillate at a frequency determined by the selected values of capacitance and inductance. In a parallel resonant circuit, the formula for the effective resistance of the circuit at resonant frequency has been given as:

$$R_t=\frac{L}{R_sC}$$

where L is the inductance of the windings, C the capacitance, and $R_s$ is the equivalent resistance determined by the D. C. circuit resistance of the coils modified by skin effect, eddy current and hysteresis losses. If the cores of the reactors become saturated, the inductance decreases but simultaneously the value of $R_s$ decreases by a greater amount, consequently, the value of $R_t$ when the core is saturated, becomes greater than the value of $R_t$ with the core in a nonsaturated condition. This phenomenon is believed to be the result of changing hysteresis losses due to operation at high frequencies.

Returning to a consideration of circuit shown in Fig. 3, collector 12 is connected to a junction point 26 which is grounded through a capacitance 27. A resistance 28 is interconnected between the junction point 26 and the source of negative potential 21. Also connected to the junction is a lead 29 adapted to be connected to any type of apparatus (not shown) desired to be operated by actuation of the transistor relay device.

Associated with and inductively coupled to the windings 23 and 24 of the saturable core reactors are two coils 31 and 32 connected in series in such a fashion that the effective magnetic fields oppose each other. If the current in the coils 31 and 32 fluctuates, then any transient currents induced in the respective windings 23 and 24 are pulses of opposite polarity. Recalling that the windings are connected in aiding series, then the induced transient currents effectively balance each other out. The coils 31 and 32 are connected in a transmission line 33 adapted to receive signals in the form of direct current pulses from a distant transmitting station.

A comparison of the circuit shown in Fig. 3 with the circuit shown in Fig. 1 reveals a substantial identity, the difference residing in the substitution of the resonant circuit for the A. C. generator 18. The equations applicable to the consideration of the circuits illustrated in Fig. 1 are also applicable in a consideration of the operating conditions of the circuit illustrated in Fig. 3. Recalling expression (4) and the fact that the expression was set up to show the requirements for stable amplification, and further that when the expression was not satisfied then the circuit assumed an astable or oscillating condition, therefore, writing the expression to show the requirements for astable operation, the expression becomes, $$(5)\qquad \frac{r_m}{r_c+R_1}>1+\frac{R_e}{r_b+R_g}+\frac{R_e}{r_c+R_1}$$

Then to apply this expression to the circuit shown in Fig. 3, the equivalent resistance $R_t$ of the resonant circuit is substituted for the generator resistance $R_g$, thus the expression is now, $$(6)\qquad \frac{r_m}{r_c+R_1}>1+\frac{R_e}{r_b+R_t}+\frac{R_e}{r_c+R_1}$$

For purposes of analyzing this expression the last term may be disregarded since the term is normally insignificant in value in comparison to the other terms. An examination of the expression reveals that an increase in $R_e$ tends to stop the circuit from assuming an astable or oscillating operating condition whereas an increase in $R_t$ tends to favor an astable or oscillating operation condition.

In order to condition the circuit for operation as a relay, the transmission line 33 is maintained de-energized (no signaling current) hence the saturable core reactors are maintained in an unsaturated condition, then the value of resistance 14 or $R_e$ is adjusted to a point where the circuit does not oscillate. Now when a signaling current is impressed on the transmission line 33, a steady magnetic field is set up by the coils 31 and 32 whose flux saturates the saturable core reactor. As previously indicated, the saturation of the core, causes the windings 23 and 24 to assume a new value of inductance and the effective resistance $R_t$ of the base circuit increases; therefore, in accordance with expression (6) the transistor 10 assumes an astable or oscillating operating condition.

The oscillating condition of the transistor 10 may be further explained by reference to Fig. 4 wherein there is plotted the base current as abscissas and base voltage as ordinates for various operating conditions of the transistor. A base load line has been drawn equal to the impedance in the base circuit, with the saturable core reactors in a saturated condition. It is to be noted that this line intersects the characteristic curve in a region of negative resistance B which is indicative of astable operation and continuous oscillations result.

In order to comprehend the operation of the transistor 10 as an oscillator, assume that a signaling current is impressed on the transmission line to effectuate the saturation of the saturable core reactors, then the load line intersects the characteristic curve in the region of negative resistance. Upon application of negative potential 21 to the transistor collector 12, a small current is caused to flow in the base circuit which drives the upper terminus of the windings 23 and 24 negative. The emitter 11 being connected to ground is therefore positive with respect to the base 13 and thus the transistor commences to conduct. Immediately upon commencement of conduction, the collector current increases to drive the base more negative and hence the emitter becomes relatively more positive to render the transistor more conductive. Assuming that the current gain in the transistor is greater than 1, then this process is cumulative until the saturation point of the transistor is reached and the collector cannot be rendered any more conductive by further injection of holes into the body of the transistor.

This movement of the operating point of the transistor is illustrated in Fig. 4 wherein the operating point moves along the dotted lines designated C and D until the turning or saturation point is reached whereupon the operating point tends to move along the line of negative resistance B but the presence of inductance (windings 23 and 24) in the base circuit opposes any instantaneous change in current, hence the voltage rises until the effect of the inductance is dissipated whereupon the operating point moves along dotted line E until the line F of the characteristic curve is intersected whereupon the operating point moves down to the junction of lines F and B and there will be a tendency for the operating point to follow along line B but again the inductance is effective to oppose a sudden change in current and as a result the operating point follows the dotted line G until the line D of the characteristic curve is again reached whereupon the path of the operating point is again traced. The transistor has no stable operating point and manifestly the transistor must operate as an oscillator producing oscillations at a frequency determined by the impedance values of the resonant elements in the base circuit and the inherent characteristics of the transistor.

The transistor now operating as an oscillator at resonant frequency applies impulses which are negative with respect to ground to a filter comprising the capacitance 27 and resistance 24. Values of capacitance and resistance are chosen to provide a time constant which is large in comparison with the resonant frequency of the negative pulses delivered by the oscillating transistor and yet is small with respect to the frequency of the signals impressed on the transmission line 33. The filter thus attenuates the high frequency impulses developed by the transistor and the output voltage impressed on the output lead 27 is substantially a D. C. voltage having a value near the peak value of the output pulses. In the present instance, the output pulses vary from a minimum which approaches the value of negative battery 21, to a maximum value approaching zero, consequently, the output voltage impressed over the lead 29 is approximately zero. This condition is illustrated in Fig. 3 wherein that portion of the output waveform which is approximately zero is designated by the reference numeral 34.

When there is an absence of signaling current in the transmission line, then the saturable core reactors are unsaturated and the effective resistance $R_t$ of the base circuit decreases. As previously indicated a decrease in the value of $R_t$ effectuates a cessation of oscillations by the transistor and the transistor is cut off. Upon cessation of oscillation, the transistor collector assumes a potential of steady magnitude being equal to the value of the negative battery source 21 minus the potential rise incurred by the residual collector current flowing through the resistance 28. This potential is impressed through the junction point 22, over the lead 27 to the associated apparatus (not shown). This value of potential is illustrated in Fig. 3 by that portion of the waveform denoted by the reference numeral 36.

Briefly summarizing the operation of the transistor relay device, it may be appreciated that upon the existence of a signaling current in the transmission line 33 the saturable core reactors become saturated and the effective resistance $R_t$ of the transistor base circuit is increased to cause the transistor to assume an astable or oscillating operating condition. The capacitance 27-resistance 28 filter attenuates the oscillations delivered to junction point 26 and an output of approximately zero volts is impressed over lead 29. In the situation wherein no signaling current is present in the transmission line 33, then the effective resistance $R_t$ of the saturable core reactors is decreased and the transistor assumes a steady state near cut off. Upon the transistor being cut off, the potential of the battery 21 less the potential rise in the resistance 28 is impressed over the lead 29. Inasmuch as the transistor device is only inductively coupled to the transmission line, then there exists a condition of direct current isolation between the transistor and transmission which permits the utilization of different reference potentials between the source of signals and the relay device.

Referring to Fig. 6, there is shown an alternative embodiment of the invention wherein tone signals in the range of 600 to 10,000 C. P. S. are used to operate the transistor relay device. Elements common to Figs. 1, 3 and 6 have been designated by common reference numerals. It is to be observed that the transistor relay device is the same as that shown in Fig. 3, the major difference residing in the provision of means for operating the relay device in response to on-off tone signals.

When there are tone signals impressed on an input line 41, the tone signals are rectified by a full-wave rectifier comprising a center-tapped transformer secondary winding 42 connected through a pair of rectifying diodes 43 to a junction point 44. Rectified tone signals appearing at junction point 44 are filtered of tone frequencies by a low pass filter consisting of a condenser 46 and a pair of coils 47 and 48. The rectifier tone signal appearing in coils 47 and 48 is substantially the same in form as the direct current signal which appears in the coils 31 and 32 of the embodiment of the invention shown in Fig. 3. The coils 47 and 48 are inductively coupled with the windings 23 and 24 of the saturable core reactors, thus the rectified tone signal saturates the cores to effectuate the operation of the transistor 10 as an oscillator. The output frequencies are attenuated by the capacitance 27-resistance 28 filter and the output over lead 29 is substantially zero with respect to ground potential.

In the situation wherein there is an absence of a tone or signal in the input line 41, then the saturable core reactor is unsaturated and, as previously described, the transistor is cut off. The potential of negative battery source 21, less the potential rise due to residual collector current flowing through resistance 28, is impressed over the output lead 27.

The present invention has been described upon the supposition that the transistor body is composed of n-type semiconductive material, however, it is to be noted that p-type semiconductive material could just as well have been used with appropriate changes being made in battery potentials. It is to be understood that the above-described circuits and arrangements of elements are simply illustrative of the application of the principles of the invention and many other modifications may be made without departing from the invention.

What is claimed is:

1. In a relay device, a transistor, a control circuit connected to said transistor for causing the transistor to be maintained in a stable condition, an inductance having a variable impedance characteristic included in the control circuit, and means inductively coupled to said inductance for varying the impedance characteristic to cause said transistor to oscillate.

2. In a relay device, a transistor having connected thereto a base circuit, a saturable core reactor connected in the base circuit, and means inductively coupled to said reactor for saturating the saturable core reactor to vary the effective resistance of the base circuit.

3. In a relay device, a transistor having a base, an emitter and a collector, an inductance connected to the base, said inductance possessing the property of changing its impedance characteristic in response to an application of a steady magnetic flux, and means inductively coupled to said inductance responsive to signals for applying a magnetic flux to the inductance to cause the transistor to oscillate.

4. In a relay device, a transistor having a base, an emitter and a collector, a resonant circuit connected to the base, an inductance having a variable impedance characteristic included in the resonant circuit, a resistance circuit interconnected between the emitter and resonant circuit to maintain the transistor substantially cut off, and means responsive to a signaling current for varying the impedance of the inductance to cause the transistor to oscillate.

5. A relay device comprising a transistor having a base, an emitter and a collector, a capacitance and an inductance connected in parallel in the base circuit to provide a resonant circuit, said inductance possessing the characteristic of being capable of changing its impedance upon being subjected to a magnetic field, means responsive to current signals for setting up a magnetic field which effectuates a change in impedance of the inductance, a resistance connected to the emitter, and means for varying the resistance to cause the transistor to oscillate.

6. In a relay device, a transistor having a base, an emitter and a collector, an inductance connected to the base, said inductance being capable of increasing its impedance upon being subjected to a magnetic flux, a source of potential connected to the collector, a resistance connected to the emitter, means for adjusting the resistance to maintain the transistor substantially cut off, and means inductively coupled to said inductance for applying a magnetic flux to the inductance to increase the effective resistance of the base to cause the transistor to assume an astable operating condition.

7. A relay device comprising a semiconductor device having a semiconducting body, a base electrode, an emitter electrode and a collector electrode in contact with said body, a source of negative potential connected to the collector electrode, a resonant circuit connected in the base circuit to cause said semiconductor device to produce oscillations, a resistance connected to the emitter electrode, means for adjusting the resistance to cause the semiconductor device to cease oscillating, and means responsive to a signalling condition for varying the effective resistance of the resonant circuit to cause the semiconductor device to commence oscillating.

8. In a relay device, a transistor having a base, an emitter and a collector, a saturable core reactor connected to the base, a source of potential connected to the collector, a resistance connected to the emitter to prevent the transistor from oscillating, a transmission line, a coil connected in the transmission line and inductively coupled with the saturable core reactor whereby the application of a signaling current to the transmission line causes the coil to set up a magnetic field to saturate the saturable core reactor, said saturable core reactor upon becoming saturated being adapted to change its impedance to cause the transistor to commence oscillating.

9. In a relay device, a transistor having a base, an emitter and a collector, a source of potential connected to the collector, an output line connected to the collector, a resonant circuit connected to the base, a saturable core reactor included in the resonant circuit, a resistance connected to the emitter to maintain the transistor cut off whereby the potenial of the source is applied over the output line, means for saturating the saturable core reactor to increase the effective resistance of the resonant circuit to cause the transistor to produce oscillations, and a filter connected to the collector to attenuate the oscillaions and apply a steady output over the ouput line.

10. In a transistor oscillator, a base circuit having a resonant circuit, a saturable core reactor included in said resonant circuit, an emitter circuit having a resistance for maintaining the transistor oscillator cut off, a coil inductively coupled to the saturable core reactor, and means for rectifying and applying a tone signal to the coil to set up a magnetic field, said magnetic field saturating the saturable core reactor to increase the effective resistance of the resonant circuit to cause said transistor oscillator to commence operation.

11. In a relay device, a transistor having a base, an emitter and a collector connected thereto, a source of negative potential connected to the collector, a saturable core reactor connected to the base, a resistance connected to the emitter to maintain said transistor cut off, a filter comprising a coil inductively coupled to the saturable core reactor, and means for rectifying and applying tone signals to the filter to remove tone frequencies whereby said coil sets up a magnetic field which saturates the saturable core reactor to change the effective resistance of the base to cause the transistor to commence oscillating.

12. In a relay device a transistor having a base, an emitter and a collector, a control circuit interconnecting said base and emitter, a saturable core reactor connected in said control circuit for holding said transistor in a stable state, and means inductively coupled to said saturable core reactor for varying the impedance thereof whereby said transistor assumes an astable condition.

13. A relay device comprising a transistor having emitter, collector, and base electrodes, a resonant circuit interconnected between the base electrode and a source of ground potential, a saturable core reactor connected in said resonant circuit, a source of negative potential connected to said collector, a variable resistance circuit interconnected between said emitter electrode and said resonant circuit at ground potential, said variable resistance being set to a value which holds said transistor from oscillating, and means for saturating said saturable core reactor to raise its impedance whereby the transistor commences to act as an oscillator.

References Cited in the file of this patent

UNITED STATES PATENTS

| | | |
|---|---|---|
| 2,407,270 | Harrison | Sept. 10, 1946 |
| 2,486,776 | Barney | Nov. 1, 1949 |
| 2,594,336 | Mohr | Apr. 29, 1952 |
| 2,629,834 | Trent | Feb. 24, 1953 |
| 2,666,139 | Endres | Jan. 12, 1954 |
| 2,683,809 | Fromm | July 13, 1954 |
| 2,701,309 | Barney | Feb. 1, 1955 |

OTHER REFERENCES

Transitor Oscillators, R. C. A. Review, vol. XIII, No. 3, pages 369–385 (page 371).